INVENTOR.
M. L. JOHNSON

INVENTOR
M. L. JOHNSON
BY Young & Quigg
ATTORNEYS

United States Patent Office 3,354,053
Patented Nov. 21, 1967

3,354,053
CONTROLLING HEAT SUPPLY AND PRODUCT PURITIES IN THE OPERATION OF A DISTILLATION COLUMN
Merion L. Johnson, Bartlesville, Okla., assignor to Phillips Petroleum Company, a corporation of Delaware
Continuation of application Ser. No. 246,998, Dec. 26, 1962. This application Dec. 27, 1966, Ser. No. 613,699
2 Claims. (Cl. 203—1)

This is a continuation of application Ser. No. 246,998, filed Dec. 26, 1962 and now abandoned.

This invention relates to controlling the operation of a distillation column. In another aspect, it relates to a method and apparatus for determining which of several trays in a distillation column is the optimum feed tray necessary to produce products of predetermined specifications from a particular feedstock at minimum heat costs. In another aspect, it relates to a method and apparatus for determining what is the optimum enthalpy of a feedstock introduced into a distillation column necessary to produce products of predetermined specifications from such feedstock at minimum heat costs. In another aspect, it relates to a method and apparatus for automatically introducing the feedstock onto the so-determined optimum feed tray. In a further aspect, it relates to a method and apparatus for controlling the heating of feedstock in accordance with the so-determined optimum feed enthalpy.

There is ever-increasing activity in the art of fractional distillation to optimize the operation of a distillation column so that fractions or products (usually distillate and bottom products) with desired specifications are produced for minimum operating costs at the column's optimum design value. Optimizing the operation of a distillation column is complicated, difficult and tricky because of the column's numerous degrees of freedom, which are characterized as independent variables, some of which are controllable, e.g., feed temperature and reboiler heat, and others of which are uncontrollable, e.g. feed flow rate and feed composition. Two important input variables are feed tray location and feed enthalpy, and the prediction of optimum values for these variables and their manipulation are the primary concern of this invention.

For optimum operation of the column, the feed tray location should be manipulated when significant changes in feed composition and/or product specifications occur. However, in practice feed tray location is often treated for long periods of operation (e.g., a year or longer) as a constant because of the complexity of the operation and a lack in sufficient and continuous operation data, notwithstanding changes in feed composition and/or product specifications. The operator in practice will usually estimate feed tray location for one feed composition, or a limited range of feed compositions, or for one set of conditions, and then not alter the location of the feed tray or only alter it infrequently. This mode of operation is usually far from optimum and often results in excess utility load and costs, lower process capacity, higher initial investment, and the products produced may be off-specification and necessitate further fractionation in yet another column in order to produce products which do meet specifications.

In many distillation columns the feed introduced into the column is heated, usually by first indirectly heat exchanging it with the bottom product of the column and then indirectly heat exchanging it with steam. It becomes necessary, for efficient and economical operation, to maintain the enthalpy or heat content of the thus heated feed at a constant value for a given operation, notwithstanding changes in feed flow rate and/or feed composition. Here, again, it has been the practice for the operator to determine what the feed enthalpy should be for a particular feed composition, or range of compositions, or for a particular feed flow rate, and then not alter the heating of the feed or only alter it infrequently. Such mode of operation also is far from optimum and often results in excess utility load and costs, etc.

Accordingly, an object of this invention is to improve the operation of a distillation column. Another object is to provide an improved method and apparatus for determining which of several trays in a distillation column is the optimum feed tray necessary to produce products of desired specifications from a particular feedstock at minimum heat costs. Another object is to provide an improved method and apparatus for automatically introducing the feedstock onto the so-determined feed tray. Another object is to provide an improved method and apparatus for determining what is the optimum enthalpy of a feedstock of a distillation column necessary to produce products of desired specifications from such feedstock at minimum heat costs. Another object is to control the heating of the feedstock in such a manner as to control the feed enthalpy thereof and perform this operation at minimum heat costs. Another object is to treat feed tray location and feed enthalpy as independent controllable variables and manipulate them in a manner to minimize heat costs. Further objects and advantages of this invention will become apparent to those skilled in the art from the following discussion, appended claims, and accompanying drawing in which:

To provide a setting or background for the subject invention, there will be described in brief fashion a conventional distillation column, illustrated in FIGURE 1.

Figure 1:
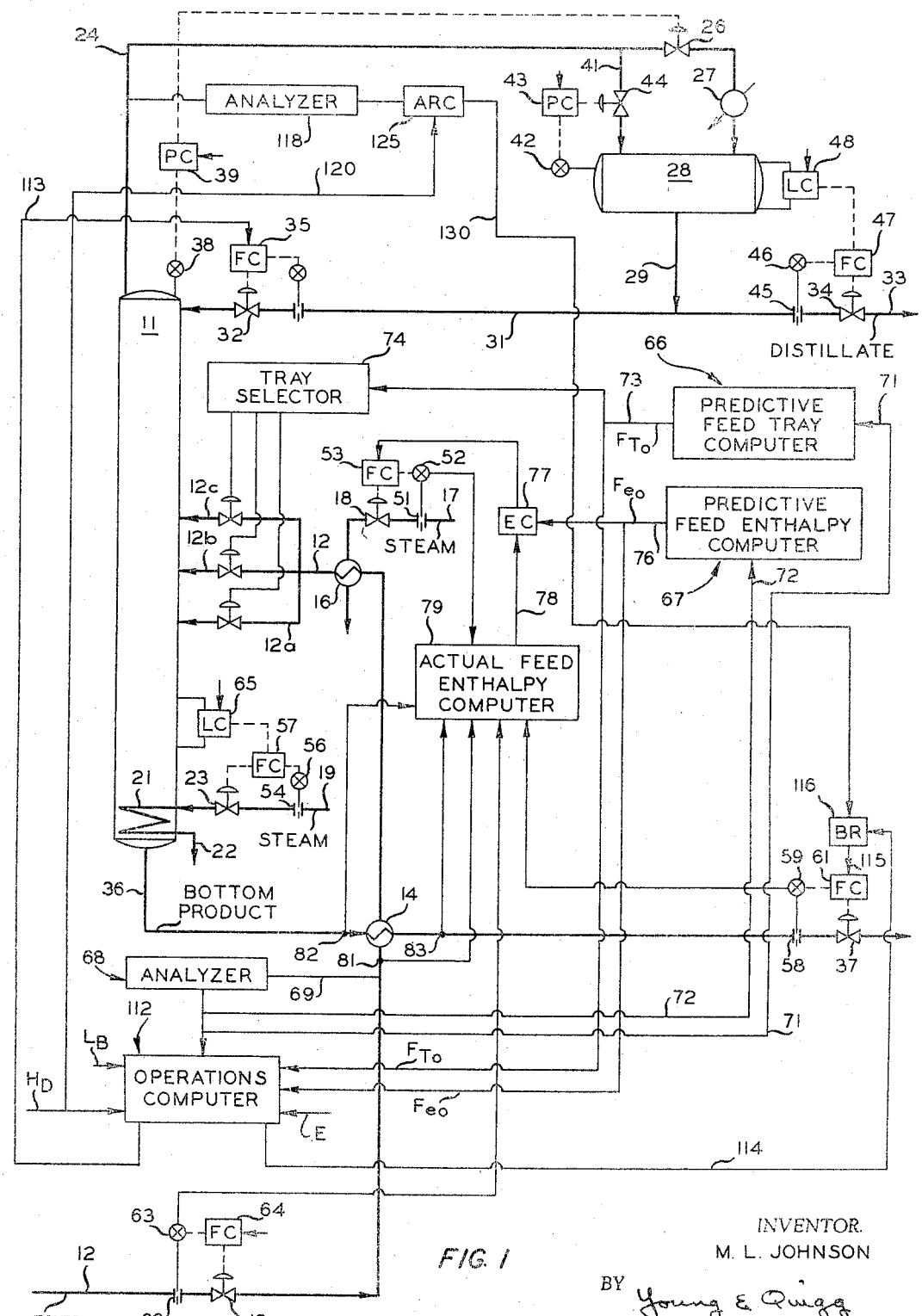
FIGURE 1 is a schematic diagram of a distillation column provided with certain features of this invention.

In FIGURE 1, there is shown a conventional fractional distillation column 11, which can be provided with a plurality of vertically spaced liquid-vapor contact trays (not shown). Feed comprising a multi-component mixture to be separated is supplied via line 12 and introduced, via one of feed tray supply lines 12a, 12b, 12c, onto a feed tray in column 11 located at an intermediate level therein, the flow rate of the feed being controlled by valve 13. Feed line 12 is associated with an indirect heat exchanger or economizer 14 and an indirect heat exchanger or preheater 16. An indirect heat exchange medium such as steam is supplied via line 17 to preheater 16, the flow rate of the heat exchange medium being controlled by valve 18. Heat is supplied to the kettle of column 11 by circulation of steam or other heat exchange medium from supply line 19 through reboiler coil 21, the heat exchange medium being withdrawn from the kettle via line 22. The flow rate of the heat exchange medium in line 19 is controlled by valve 23. Vapors are removed from the top of column 11 through overhead line 24, the flow rate being controlled by valve 26, and passed through a cooler 27 such as an air-cooled condenser, the resulting liquid being passed to an accumulator 28. Liquid distillate in accumulator 28 is withdrawn via line 29, and a portion of this withdrawn liquid is recycled via line 31 as external reflux to the top of column 11, the flow rate of the external reflux being controlled by valve 32. The balance of the liquid distillate withdrawn from accumulator 29 is removed from the system through line 33 and yielded as distillate product, the flow rate being controlled by valve 34. Bottom product is withdrawn from the kettle of column 11 via line 36 and it is passed in indirect heat exchange relationship through economizer 14 with the feed in line 12, the flow rate of the bottom product being controlled by valve 37.

Thus far, there has been described a conventional distillation column which by itself does not constitute the subject invention. The object of the distillation column, of course, is to separate the multi-component feed into at least two fractions, usually an overhead and a bottom product. The light components of the feed will appear mainly in the overhead and the heavy components of the feed will appear mainly in the bottom product. The light components will comprise a light component generally designated as L and components lighter than the light component generally designated as $L_L$, while the heavy components will comprise a heavy component generally designated as H and components heavier than the heavy component designated as $H_H$. Since perfect separation between the light key component L and the heavy key component H is impossible, some of the heavy key component H will appear as an impurity in the overhead (and thus in the distillate product) and some of the light key component L will appear as an impurity in the bottom product. However, the amounts of these impurities can be kept down to desired levels by proper operation of the column. The operation of a distillation column can be specified by specifying the fraction $H_D$ of the heavy key component desired in the overhead (or distillate product) and the fraction $L_B$ of the light key component desired in the bottom product. If these specifications are to be met at minimum operating costs and at maximum utilization of the column, corrective actions must be taken at the proper time and rate to minimize the effects of disturbances on product compositions and flows.

The operation of such a distillation column is affected by disturbances in independent input variables (i.e., variables which can change or be changed independently without any effect of one upon the other). Such independent variables can either be manipulated or are uncontrolled. Feed composition and feed flow rate are examples of independent input variables which often cannot be altered or controlled (within the limits of the process in question). Feed temperature, reflux temperature, and reboiler steam flow are examples of manipulated or controlled independent input variables. Then there are dependent output variables, such as the purities of the distillate and bottom products, which are a function or result of the independent variables. As should be evident, a distillation column has numerous degrees of freedom and any significant step in the control of the operation of a distillation column must reduce these degrees of freedom.

The degrees of freedom of the distillation column of FIGURE 1 can be reduced by providing it with minimum controls well known in the art. Referring now to the drawing, a constant presure in the top of column 11 can be maintained by an assembly comprising a pressure transducer 38 and presure controller 39 in conjunction with control valve 26. A constant pressure can be maintained in accumulator 28 by passing a small amount of overhead from line 24 to accumulator 28 via by-pass line 41, the constant pressure being provided by an assembly comprising pressure transducer 42, pressure controller 43 and flow control valve 44. The flow rate in distillate product line 33 can be controlled by an assembly comprising orifice plate 45, differential pressure transducer 46 and flow controller 47 in conjunction with control valve 34, flow controller 47 being manipulated or cascaded by a liquid level controller 48 associated with accumulator 28, so as to maintain a constant liquid level in the accumulator. The volume flow rate of steam in line 17 can be controlled by an assembly comprising orifice plate 51, differential pressure transducer 52 and flow controller 53 in conjunction with flow control valve 18. The volume flow rate of steam in line 19 can be controlled by an assembly comprising orifice plate 54, differential pressure transducer 56 and flow controller 57 in conjunction with flow control valve 23. The flow rate of bottom product in line 36 can be controlled by an assembly comprising orifice plate 58, differential pressure transducer 59 and flow controller 61 in conjunction with control valve 37. Similarly, the flow rate of feed in line 12 can be manipulated by an assembly comprising orifice plate 62, differential pressure transducer 63 and flow controller 64 in conjunction with flow control valve 13, the setpoint of the controller usually being adjusted to satisfy the inventory requirements of the upstream processes. Further reduction in the degrees of freedom in the column can be accomplished by using the level of liquid in the reboiler of column 11 to manipulate the volume of steam passed via line 19 to the reboiler. This can be done by an assembly comprising a liquid level controller 65 which manipulates the setpoint of flow controller 57. The use of these minimum control features of the prior art reduces the number of the degrees of freedom of the column. However, many input variables can still affect the operation.

There will now be described, how, according to this invention, the optimum feed tray location and the optimum feed enthalpy of a distillation column can be predicted and how the feed can be automatically introduced onto the optimum feed tray and the heating of the feed controlled to maintain the optimum feed enthalpy, notwithstanding changes in feed flow rate, feed composition, and product specifications and at minimum steam costs.

Briefly, a predictive, statistically-derived equation for reboiler heat is developed, and the cost of steam (or other heat exchange medium) necessary to supply this predicted reboiler heat quantity is added to the cost of steam (or other heat exchange medium) necessary to heat (in a heat exchanger) the feed to a desired enthalpy quantity, to obtain, in the form of an equation, the total cost of the steam necessary to heat the reboiler and feed. The partial derivative of this total heat cost equation with respect to feed tray location, and the partial derivative of said equation with respect to feed enthalpy, are each taken, these partial derivatives are set equal to zero, and the optimum feed tray location and optimum feed enthalpy values are solved for. The so-determined optimum feed tray location and optimum feed enthalpy value are produced in the form of signals, and these signals can be recorded and used for monitoring purposes, or used as set-point-adjusting signals to automatically introduce the feed onto the so-determined optimum feed tray and to control the heating of the feed, such manipulation of these variables being achieved at minimum total heat costs.

The statistically-derived equation for reboiler heat is based on the expression:

$$H_R = f(F, C_c, E, F_T, F_e, H_D, L_B) \qquad (1)$$

where:

$H_R$ = predicted heat supplied to column by reboiler (B.t.u./hour)
$F$ = feed flow rate (lb./hour)
$F_c$ = generic symbol for components in feed, each expressed as a liquid volume fraction of feed
$E$ = average column tray efficiency
$F_e$ = feed enthalpy (B.t.u./lb. of feed)
$F_T$ = feed tray (numbering trays from top of column)
$H_D$ = specified liquid volume fraction of heavy key component in distillate product
$L_B$ = specified liquid volume fraction of light key component in bottom product For practical purposes, it is preferred to develop expression (1) for the ratio of reboiler heat-to-feed flow rate:

$$\frac{H_R}{F} = f(F_c, E, F_T, F_e, H_D, L_B) \qquad (2)$$

The exact equation used to predict what the reboiler heat rate of the distillation column should be to obtain a specified separation will vary. But having determined what independent variables are significantly related to reboiler heat, it is possible by straight-forward, well-known statistical methodology to determine how these significant variables can be combined in an equation to predict reboiler heat with specified limits of accuracy to compensate for changes in feed composition and feed flow. One means of developing such an equation is the response surface experiment or empirical surface study, wherein the approximate value of reboiler heat is found on the basis of the independent variables. This empirical study of reboiler heat will be adequate when the ranges of the independent variables are predetermined, and when the effects of other factors are known to be insignificant or constant. The procedure for determining the response surface is straightforward. For this purpose, the Box-Wilson central composite designs will be quite useful since they will determine the curvature in the response surface in the region of interest. These designs provide data estimating linear, quadratic, and two-factor interaction effects by measuring each variable at five different levels, and, where plant data is used rather than theoretical data, repeating a single observation several times in order to estimate the non-reproducibility of the measurements. When the functional relationship between reboiler heat and the independent variables has thus been determined, it then is necessary to determine the coefficients in the predictive equation. One common method of analysis which can be used to determine these coefficients is called regression analysis. Regression analysis assumes a relationship between the dependent variable (reboiler heat) and each term in the proposed equation, and determines the best set of coefficients for the predictive equation. The criterion for calculating the best set of constants for the equation is Gauss' familiar Principle of Least Squares, and it determines the percent of the variation in reboiler heat that is explained by the equation, and establishes the precision of the equation in terms of Standard Error of Estimate.

The following summarizes the statistical approach in deriving a predictive equation for reboiler heat:

(1) Select all independent variables believed to exert a significant effect upon reboiler heat;

(2) Design and carry out screening experiments to test for the significant effects of the independent variables;

(3) Perform a correlation analysis to identify variables which should be represented in a predictive equation;

(4) Perform a surface response experiment either on the actual operating column or by tray-to-tray calculations (e.g., on a digital computer) to obtain data, using a suitable experimental design for data gathering, such as the Box-Wilson composite design; and (5) Using regression analysis, determine the best set of coefficients for an assumed form of the predictive equation and determine the precision of the equation in terms of Coefficient of Determination and Standard Error of Estimate.

Those skilled in the art of statistics will be able to determine the predictive equation for reobiler heat for any distillation column, in view of the foregoing discussion.

Following prediction of reboiler heat input rate as expressed by Equation 2 and the application of the reboiler heat input rate to the control of the distillation column to obtain products of desired composition, basic Equation 2 is further employed to determine, on an economic basis, the minimum cost of providing the required heat input, both by the reboiler and by the feed preheater. Thereby, production of desired composition product streams at minimum total heat cost is performed.

Assuming that the steam (or other heat exchange medium) necessary to heat the reboiler costs $C_{S1}$ ($/B.t.u.), the cost of the steam necessary to heat the reboiler at the rate $H_R/F$ is:

$$C_{RS} = C_{S1}\left(\frac{H_R}{F}\right) \qquad (3)$$

where:

$C_{RS}$ = Cost of reboiler heat ($/lb. of feed)
$C_{S1}$ = Unit cost of steam to reboiler ($/B.tu.)

Where the feed is heated by the bottom product in the economizer, and the feed is then heated in the preheater and introduced onto the feed tray at its bubble point, partially vaporized, at its dew point, or in its superheated state, the heat necesary to heat the feed and raise its ethalpy to a desired value can be found from the equation:

$$H_P = F_e - C_{pF}(T_i - T_o) - \frac{F_B}{F_F}(C_{pB})(T_{B1} - T_{B2}) \qquad (4)$$

where:

$H_P$ = heat given to feed in the preheater (B.t.u./lb. of feed)
$F_e$ = total enthalpy of the feed referred to $T_o$ (B.t.u./lb. of feed)
$C_{pF}$ = average specific heat of feed (B.t.u./lb.$\times°$ F.)
$T_i$ = temperature of feed before entering economizer exchanger (° F.)
$T_o$ = arbitrary reference temperature used to compute $F_e$
$F_B$ = bottom product flow (lb./hr.)
$F_F$ = feed flow (lb./hr.)
$C_{pB}$ = average specific heat of bottom product (B.t.u./lb.$\times°$ F.)
$T_i$ = temperature of feed before entering economizer exchanger (° F.)
$T_{B2}$ = temperature of bottom product leaving economizer exchanger (° F.)

Assuming the steam (or other heat exchange medium) used to heat the preheater costs $C_{S2}$ ($/B.t.u.), then the cost of the steam used by the preheater to heat the feed to the desired feed enthalpy value is:

$$C_{PS} = C_{S2}(H_P) \qquad (5)$$

where:

$C_{PS}$ = cost of preheater heat ($/lb. of feed)
$C_{S2}$ = unit cost of steam to preheater ($/B.t.u.)

The total steam cost for the column are:

$$C_{TS} = C_{RS} + C_{PS} \qquad (6)$$

where $C_{TS}$ = total cost of heating reboiler and preheater ($/lb. of feed)

The total steam costs are minimized, according to this invention, by manipulating at least one of, preferably both, feed tray location and feed enthalpy. In order to do this the partial derivative of Equation 6 with respect to feed tray location, and the partial derivative of Equation 6 with respect to feed enthalpy, must both be equal to zero. That is:

$$\frac{\partial C_{TS}}{F_T} = 0 \qquad (7)$$

and $$\frac{\partial C_{TS}}{F_e} = 0 \qquad (8)$$

Accordingly, these partial derivatives are taken, set equal to zero, and the resulting equations are solved for optimum feed tray location and optimum feed enthalpy.

As an example, the distillation column 11 of FIGURE 1 is used as a debutanizer to separate a mixture of hydrocarbons to produce a distillate product comprising isopentane $iC_5$, normal butane $nC_4$, isobutane $iC_4$, and propane $C_3$, and a bottom product comprising normal butane $nC_4$, isopentane $iC_5$, normal pentane $nC_5$ and some components heavier than $nC_5$ designated $C_6+$. Isopentane $iC_5$ is the heavy key component and appears as an impurity in the distillate product, while normal butane $nC_4$ is the light key component and appears as an impurity in the bottom product.

The data of Table I is representative of the statistical designed experiment that was necessary to describe the surface response of column 11.

Based on the data such as shown in Table I and expression (10), the following predictive, statistically-derived

TABLE I

| Run | Feed components (liquid volume percent) | | Product specifications (liquid volume percent) | | | | $F_e{}^1$ | $F_T{}^2$ | $R_{Ip}/F^3$ | $H_R/F$ |
|---|---|---|---|---|---|---|---|---|---|---|
| | $C_3+iC_4$ | $nC_4$ | $iC_5$ | $L_B$ | $H_D$ | E | | | | |
| 1 | 37.0 | 30.5 | 13.0 | 1.0 | 0.2 | 74 | 11 | 19 | 1.028 | 125.3 |
| 2 | 26.0 | 25.5 | 13.0 | 1.0 | 0.4 | 74 | 25 | 31 | 0.844 | 120.7 |
| 3 | 37.0 | 25.5 | 9.0 | 1.0 | 0.4 | 74 | 11 | 19 | 0.724 | 103.7 |
| 4 | 26.0 | 30.5 | 13.0 | 0.4 | 0.4 | 60 | 25 | 31 | 1.454 | 182.3 |
| 5 | 26.0 | 25.5 | 9.0 | 1.0 | 0.4 | 60 | 25 | 31 | 0.825 | 131.5 |
| 6 | 37.0 | 25.5 | 13.0 | 0.4 | 0.4 | 74 | 25 | 19 | 0.884 | 97.5 |
| 7 | 26.0 | 30.5 | 9.0 | 0.4 | 0.4 | 74 | 25 | 31 | 0.861 | 131.3 |
| 8 | 37.0 | 30.5 | 9.0 | 0.4 | 0.4 | 60 | 11 | 19 | 0.906 | 122.2 |
| 9 | 31.5 | 23.0 | 11.0 | 0.7 | 0.3 | 67 | 18 | 25 | 0.759 | 111.8 |
| 10 | 20.5 | 28.0 | 11.0 | 0.7 | 0.3 | 67 | 18 | 25 | 0.825 | 143.8 |
| 11 | 42.5 | 28.0 | 11.0 | 0.7 | 0.3 | 67 | 18 | 25 | 0.864 | 90.0 |
| 12 | 31.5 | 28.0 | 11.0 | 0.7 | 0.3 | 67 | 4 | 25 | 0.816 | 128.3 |
| 13 | 31.5 | 28.0 | 11.0 | 0.7 | 0.3 | 67 | 32 | 25 | 0.875 | 107.4 |
| 14 | 31.5 | 28.0 | 11.0 | 0.2 | 0.3 | 67 | 18 | 25 | 1.036 | 142.5 |

[1] Reference temp. 151° F.
[2] Trays numbered from top of column.
[3] $R_{Ip}/F$ = internal reflux flow-to-feed flow ratio.

Eighty-one runs were actually used to describe the surface and the runs in Table I are typical. The data for this experiment were obtained by tray-by-tray calculations on an I.B.M. 7090 digital computer. It is also possible to obtain the data from an actual operating column. However, this presents many problems, chief among which is that the variables usually do not change or cannot be changed over the range necessary to complete the statistically designed experiment.

Expression (1) can be rewritten as follows for the debutanizer column example set forth above:
where:

$$H_R = f(C_3, iC_4, nC_4, iC_5, nC_5, F, E, F_T, F_e, H_D, L_B) \quad (9)$$

where:

$H_R$ = predicted reboiler heat (B.t.u./hour)
$C_3$ = liquid volume fraction of propane in feed
$iC_4$ = liquid volume fraction of isobutane in feed
$nC_4$ = liquid volume fraction of normal butane in feed
$iC_5$ = liquid volume fraction of isopentane in feed
$nC_5$ = liquid volume fraction of normal pentane in feed
$F$ = feed flow rate (lb./hour)
$E$ = average column tray efficiency
$F_T$ = feed tray location (trays numbered from top of column)
$F_e$ = feed enthalpy (B.t.u./lb. of feed)
$H_D$ = specified liquid volume fraction of isopentane desired in distillate
$L_B$ = specified liquid volume fraction of normal butane desired in bottom product Equation 9 shows that the value for $H_R$ is a function of the specified product purities, $H_D$ and $L_B$, feed enthalpy $F_e$, feed tray location $F_T$, feed flow $F$, average column tray efficiency $E$, and feed composition ($C_3$, $iC_4$, $nC_4$, $iC_5$, $nC_5$). A study of the feed stream indicated that the composition variables could be simplified. A specific relationship was found between isopentane $iC_5$ and normal pentane $nC_5$. The relationship was expressed by an independent equation which states that the ratio of these two components is constant. Only one of the two components needed to be included as a variable in the reboiler heat equation. The feed stream component variables were further simplified by treating the sum of propane $C_3$ and isobutane $iC_4$ as a single variable ($C_3+iC_4$). The ratio of reboiler heat $H_R$ to feed flow F is a function of all of the other variables of the system as expressed in Equation 9. The expression was developed for the ratio $H_R$ to F:

$$\frac{H_R}{F} = f[(C_3+iC_4), nC_4, iC_5, E, F_T, F_e, H_D, L_B] \quad (10)$$

equation was developed:

$$\frac{H_R}{F} = K_2 + \{K_1 + iC_5[K_2 + K_3(nC_4) + K_4(iC_5) + K_5(C_3+iC_4)] + K_6(C_3+iC_4)\} + [K_b + K_c(C_3+iC_4) + K_d(iC_5)] + K_e(C_3+iC_4) + K_f(nC_4)(iC_5) - F_e \quad (11)$$

where:

$H_R/F$ = reboiler heat-to-feed flow ratio (B.t.u./lb. of feed)
$K_1 = A_1 + A_2(F_T)^2 + A_3E + A_4(E)^2$
$\quad + A_{23}(F_e)^2 + H_D[(A_9) + A_{10}(H_D) + A_{11}(L_B)$
$\quad\quad + A_{12}(E)] + L_B[(A_5)(L_B) + A_7 + A_8(F_T)]$
$K_2 = A_{13}(L_B) + A_{14}(E)(H_D) + A_{15}(E)$
$\quad\quad\quad\quad + A_{17}(H_D) + A_{16}(E)(F_T)$
$K_3 = A_{18} + A_{19}(E)$
$K_4 = A_{20}$
$K_5 = A_{21}(E)$
$K_6 = A_{22}(F_e)$
$K_a$ through $K_f$ = constants
$A_1$ through $A_{23}$ = constants The partial differentiation of Equation 6, which includes Equations 3 and 10, with respect to feed tray results in the following equation:

$$\frac{\partial C_{TS}}{\partial F_T} = C_{S1}[2A_2(F_T) + A_8(L_B) + A_{16}(E)(iC_5)][K_b + K_c(C_3+iC_4) + K_d(iC_5)] \quad (12)$$

With respect to feed enthalpy, the partial derivative is:

$$\frac{\partial C_{TS}}{\partial F_e} = C_{S1}\{[2A_{23}(F_e) + A_{22}(C_3+iC_4)][K_b + K_c(C_3+iC_4) + K_d(iC_5)] - 1\} + C_{S2} \quad (13)$$

Setting these equations equal to zero and solving for optimum feed tray location, $F_{To}$, and optimum feed enthalpy, $F_{eo}$:

$$F_{To} = -\frac{A_8(L_B)}{2A_2} - \frac{A_{16}(E)}{2A_2}(iC_5) \quad (14)$$

$$F_{eo} = \frac{C_{S1} - C_{S2}}{C_{S1}(2A_{23})[K_b + K_c(C_3+iC_4) + K_d(iC_5)]} - \frac{A_{22}}{2A_{23}}(C_3+iC_4) \quad (15)$$

Equations 14 and 15 can be simplified as follows:

$$F_{To} = K_v + K_w(iC_5) \quad (16)$$

where:

$$K_v = -\frac{A_8(L_B)}{2A_2}$$

$$K_w = -\frac{A_{16}(E)}{2A_2}$$

and $$F_{eo} = \frac{K_x}{K_y[K_b + K_c(C_3 + iC_4) + K_d(iC_5)]} + K_z(C_3 + iC_4) \quad (17)$$

where:

$$K_x = C_{S1} - C_{S2}$$
$$K_y = C_{S1}(2A_{23})$$
$$K_z = -\frac{A_{22}}{2A_{23}}$$

The predicted values of optimum feed tray location, $F_{To}$, and optimum feed enthalpy, $F_{eo}$, will be those required for minimum steam costs. Of course, the cost of the steam necessary to heat the reboiler may not be the same, in many instances, as the cost of the steam necessary to heat the preheater, due to the differences in sources, plant layout, temperature requirement, etc. However, if the cost of the reboiler steam and preheater steam are the same, in which case $C_{S1}$ is equal to $C_{S2}$, Equation 15 becomes:

$$F_{eo} = -\frac{A_{22}}{2A_{23}}(C_3 + iC_4) \quad (18)$$

and the simplified variation of Equation 18 becomes:

$$F_{eo} = K_z(C_3 + iC_4) \quad (19)$$

where:

$$K_z = -\frac{A_{22}}{2A_{23}}$$

It should be noted that the above predicted values for $F_{To}$ and $F_{eo}$ can be computed independently, i.e., that neither is a function of the other. However, for some columns it may be that the predictive equation for reboiler heat $H_R$ may turn out such that $F_{eo}$ and $F_{To}$ are functions of one another. For example, the partial derivative of $C_{TS}$ with respect to $F_T$ and $F_e$ may be:

$$\frac{\partial C_{TS}}{\partial F_T} = 2A_2(F_T) + A_3(F_e) + A_5(iC_5) \quad (20)$$

$$\frac{\partial C_{TS}}{\partial F_e} = C_{S1}\{[2A_1(F_e) + A_3(F_T) + A_4(C_3 + iC_4)][K_b + K_c(C_3 + iC_4) + K_d(iC_5)] - 1\} + C_{S2} \quad (21)$$

In this case, the partial derivative Equations 20 and 21 set equal to zero result in two simultaneous equations that contain $F_{To}$ and $F_{eo}$; thus:

$$F_{To} = -\frac{A_3}{2A_2}(F_{eo}) - \frac{A_5}{2A_2}(iC_5) \quad (22)$$

$$F_{eo} = \frac{C_{S1} - C_{S2}}{C_{S1}(2A_1)[K_b + K_c(C_3 + iC_4) + K_d iC_5]} - \frac{A_3}{2A_1}(F_{To}) - \frac{A_4}{2A_1}(C_3 + iC_4) \quad (23)$$

Equations 22 and 23, respectively, can be simplified as follows:

$$F_{To} = K_q(F_{eo}) + K_r(iC_5) \quad (24)$$

where:

$$K_q = -\frac{A_3}{2A_2}$$

$$K_r = -\frac{A_5}{2A_2}$$

$$F_{eo} = \frac{K_x}{K_s[K_b + K_c(C_3 + iC_4) + K_d(iC_5)]} + K_t(F_{To}) + K_u(C_3 + iC_4) \quad (25)$$

where:

$$K_x = C_{S1} - C_{S2}$$
$$K_s = C_{S1}(2A_1)$$
$$K_t = -\frac{A_3}{2A_1}$$
$$K_u = -\frac{A_4}{2A_1}$$

Referring again to FIGURE 1, reference number 66 generally designates a "predictive feed tray computer," which computer can be used according to this invention to automatically and in a continuous manner compute the optimum feed tray location, $F_{To}$, and reference number 67 designates a "predictive feed enthalpy computer" which similarly computes optimum feed enthalpy, $F_{eo}$. These computers 66, 67 produce signals which can be used for purposes of monitoring or to manipulate appropriate controllers.

The feed composition information needed in the solution of the above described equations for optimum feed tray location and optimum feed enthalpy can be supplied by an analyzer generally designated 68, the latter being in communication with feed line 12 by reason of sampling line 69. Analyzer 68 comprises any suitable instrument which continuously or substantially continuously (i.e., rapid cycle) analyzes the feed and determines the relative amounts, e.g., liquid volume percent, of the components in the feed which function as independent variables in the predictive equation, and produces signals proportional thereto. Analyzer 68, such as described in I.S.A. Journal, vol. 5, No. 10, p. 28 October 1958, preferably comprises a high speed chromatographic analyzer having a sampling valve, motor, detector, chromatographic column, programmer, and a peak reader, the latter functioning to read the peak height of the components, giving an equivalent output signal which is suitable for control purposes. In operation, sample flows continuously through the analyzer. At a signal from the programmer, a measured volume of sample is flushed into the chromatographic column. When a sample component arrives at the detector, the resulting signal is measured, amplified, and stored until the next signal when the sequence is repeated. The stored signal is a continuous output signal analogous to the amount of the component present. Such an analyzer and the operation thereof are well known in the art.

The feed composition information necessary for determining the feed tray location is supplied to computer 66 from analyzer 68 by signal line 71, and the feed composition information necessary for determining the feed enthalpy is supplied to computer 67 from analyzer 68 by signal line 72.

Computer 66 produces an output signal 73 representative of $T_{To}$, and this signal can be transmitted to a recorder (not shown) and used for monitoring purposes, but is preferably transmitted to a tray selector 74, or the like, which is used to manipulate the flow control valves in feed tray supply lines 12a, 12b and 12c, so as to automatically introduce the feed from supply line 12 onto the optimum feed tray, or a tray in column 11 which is the closest to the optimum feed tray.

Computer 67 produces an output signal 76 representative of $F_{eo}$ and this signal can be transmitted to a recorder (not shown) and used for monitoring purposes only, but preferably is transmitted to an enthalpy recorder controller 77, to which is supplied a signal 78 representing a value proportional to the actual or measured feed enthalpy. Enthalpy controller 77 compares signals 76 and 78, and accordingly manipulates the set point of steam flow controller 53 so as to maintain the enthalpy of the feed introduced into column 11 at the predicted optimum feed enthalpy value. In the event that the measured or actual feed enthalpy signal 78 is smaller in magnitude than the predicted optimum feed enthalpy signal 76, flow controller 53 will accordingly open the flow control valve 18 so as to add more heat to the feedstock flowing through line 12 in indirect heat exchange with preheater 16. Conversely, if the actual or measured enthalpy feed signal 78 is greater in magnitude than the optimum feed enthalpy signal 76, steam flow controller 53 will accordingly manipulate valve 18 by closing down the same to decrease the heat supplied to the feed 12 by preheater 16.

The actual or measured feed enthalpy value 78 can be computed by computer 79 accordingly to that disclosed and claimed in copending application Ser. No. 125,025 now U.S. Patent No. 3,269,921, filed July 3, 1961, by M. W. Oglesby, Jr. and D. E. Lupfer. Where the feed at the exit of economizer 14 is partially vaporized, the feed enthalpy of the feed introduced into the distillation column 11 of FIGURE 1 can be found by solution of the equation:

$$F_e = C_{pF}(T_i - T_o) + (F_S/F_F)(h_s) + (F_B/F_F)(C_{pB})(T_{B1} - T_{B2}) \quad (26)$$

where:

$F_e$ = total enthalpy of the feed referenced to $T_o$ (B.t.u./lb. of feed)
$C_{pF}(T_i - T_o)$ = initial enthalpy of feed (B.t.u./lb. of feed)
$(F_B/F_F)C_{pB}(T_{B1} - T_{B2})$ = enthalpy given to the feed in the economizer exchanger (B.t.u./lb. of feed)
$(F_S/F_F)h_s$ = enthalpy given to the feed in the feed preheater (B.t.u./lb. of feed)
$C_{pF}$ = average specific heat of feed (B.t.u./lb.×° F.)
$T_i$ = temperature of feed before entering economizer exchanger (° F.)
$F_S$ = steam flow (lb./hr.)
$F_F$ = feed flow (lb./hr.)
$F_B$ = bottoms product flow (lb./hr.)
$h_s$ = difference in enthalpy of steam entering preheater and the condensate (B.t.u./lb. of steam)
$C_{pB}$ = average specific heat of bottoms product (B.t.u./lb.×° F.)
$T_{B1}$ = temperature of bottoms product entering economizer exchanger (° F.)
$T_{B2}$ = temperature of bottoms product leaving economizer exchanger (° F.)
$T_o$ = arbitrary reference temperature used to compute $H_T$ (° F.)

Referring again to FIGURE 1, signals proportional to the square of the flow rates of steam in line 17, feed in line 12, and bottoms product in line 36, as established by differential pressure transducers 52, 63 and 59, respectively, are transmitted to the actual feed enthalpy computer 79 for solution of Equation 26. Temperature transmitters 81, 82 and 83 can be provided to detect the temperatures $T_i$, $T_{B1}$, and $T_{B2}$ of Equation 26, and these signals can also be transmitted to computer 79. In the interest of brevity, no further discussion will be made here of the computation or measurement of actual feed enthalpy, since the same is adequately disclosed in said copending application Ser. No. 125,025 now U.S. Patent No. 3,269,921.

Figure 2:
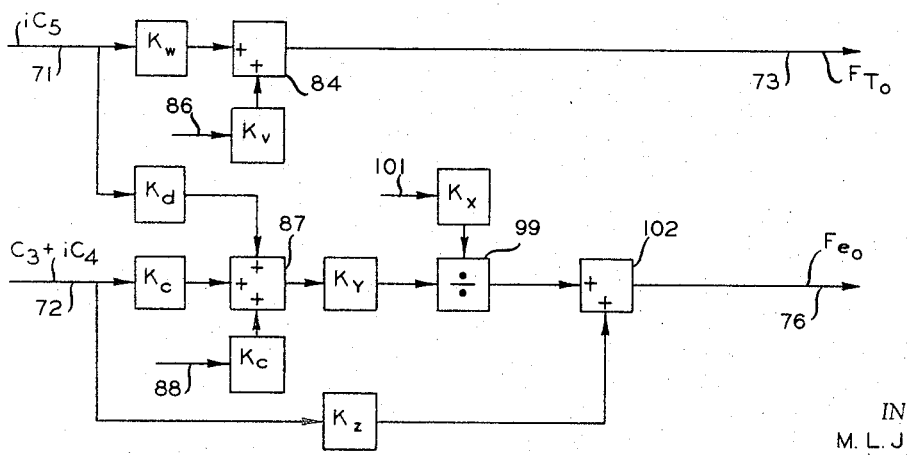

In FIGURE 2, I have illustrated suitable mathematical analog instrumentation which can be used in solution of Equations 16 and 17. And in FIGURE 3, I have illustrated suitable mathematical analog instrumentation which can be used in the solution of Equations 24 and 25. Referring to FIGURE 2, signal 71, representing $iC_5$ (i.e., the liquid volume fraction of isopentane) in feed 12, as determined by analyzer 68, is applied across potentiometer $K_w$, and the resulting product signal is transmitted to a summing relay or adder 84. A reference potential 86 is applied across potentiometer $K_v$, and the resulting signal is also transmitted to relay 84, the output signal 73 from the latter being proportional to the optimum feed tray location, $F_{To}$. Signal 72, representing the sum of $C_3$ and $iC_4$ in the feed, as determined by analyzer 68 of FIGURE 1, is applied across a potentiometer $K_c$, and the resulting product signal transmitted to summing relay 87. In addition, signal 71 is applied across potentiometer $K_d$ and the resulting product signal is transmitted to relay 87. A potential 88 is applied across potentiometer $K_b$, and the resulting output is also transmitted to relay 87. The sum signal from relay 87 is applied across potentiometer $K_y$ and the resulting product signal is transmitted to a divider 99. A potential 101 is applied across a potentiometer $K_x$ and transmitted to a divider 99, the quotient signal therefrom being transmitted to summing relay 102. Signal 72 is also applied across a potentiometer $K_z$, and the resulting product signal is also transmitted to relay 102. The resulting sum output signal 76 from relay 102 is proportional to the optimum feed enthalpy value, $F_{eo}$.

Figure 3:
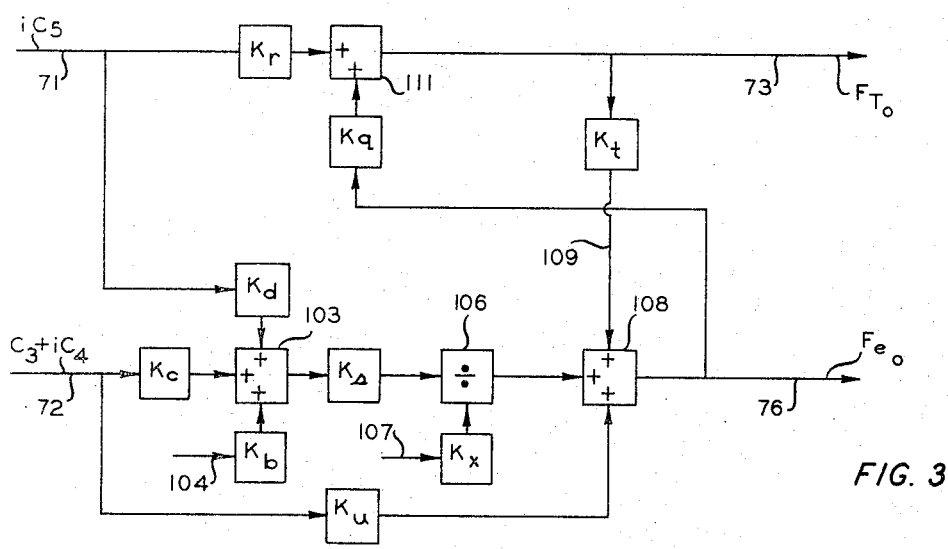
FIGURES 2 and 3 are schematic diagrams of certain methematical analog instrumentation which can be used to determine the optimum feed tray location and optimum feed enthalpy, respectively, for the column illustrated in FIGURE 1.

Referring to FIGURE 3, a signal 72 representing the sum of $C_3$ and $iC_4$ in the feed is applied across a potentiometer $K_c$ and the resulting product signal transmitted to summing relay 103. Signal 71, representing $iC_5$ in the feed, is applied across a potentiometer $K_d$, and the resulting product signal transmitted to summing relay 103. A reference potential 104 is applied across a potentiometer $K_b$, and the resulting signal also transmitted to relay 103. The sum output signal from relay 103 is applied across a potentiometer $K_s$, and the resulting product signal transmitted to divider 106. A reference potential 107 is applied across potentiometer $K_x$, and the resulting signal transmitted to divider 106. The quotient signal from divider 106 is transmitted to summing relay 108. Signal 72 is also applied across potentiometer $K_u$, and the resulting product signal transmitted to summing relay 108. A signal 109 proportional to $K_t(F_{To})$ is also transmitted to relay 108. The latter produces a sum output signal 76 proportional to $F_{eo}$. A signal proportional to this latter value is applied across a potentiometer $K_q$, and the resulting product signal transmitted to summing relay 111. Signal 71 is applied across potentiometer $K_r$, and the resulting product signal also transmitted to relay 111. The sum output signal 73 of the latter is representative of $F_{To}$. A value proportional to the latter is applied across potentiometer $K_t$ and the resulting product signal 109 transmitted to relay 108 for determination of $F_{eo}$.

Figure 4:
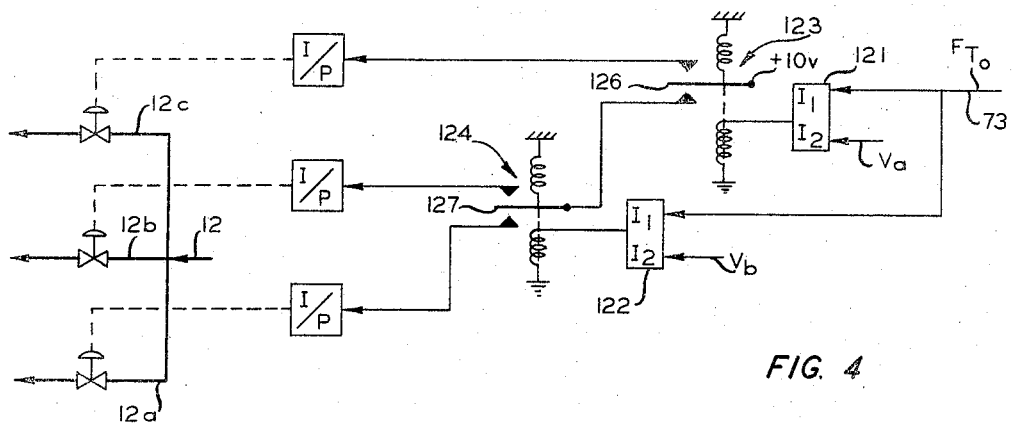
FIGURE 4 is a schematic diagram of certain instrumentation which can be used to select the optimum feed tray from several possible feed trays.

In FIGURE 4, I have illustrated a suitable tray selector and it comprises voltage comparators 121, 122 and relay switches 123, 124. Feed tray supply lines 12a, 12b and 12c are shown, each having flow control valves therein, such valves being normally closed air-operated diaphragm valves, controlled by the selector, which in turn is manipulated by signal $F_{To}$ from computer 66.

$V_a$ is a voltage representing the tray number midway between the trays supplied by supply lines 12c and 12b, and $V_b$ is a voltage representing the tray number midway between the trays supplied by supply lines 12a and 12b. Each of voltage comparators 121 and 122 have two inputs, $I_1$ and $I_2$, as shown. These voltage comparators are energized when $I_1$ (corresponding to $F_{To}$) is greater than $I_2$ (i.e., when $F_{To}$ is greater than $V_a$ and $V_b$). Relays 123 and 124 each comprise a pivotal contact 126, 127, respectively, which is normally biased in an "up" position by a spring, and a rod connected to the contact at one end is surrounded by an electrical coil at the other end, said coil being energized by its adjacent voltage comparators. The boxes containing "I/P" in FIGURE 4 are conventional current-to-pressure converters.

In operation, when $F_{To}$ is less than either of $V_a$ or $V_b$, the voltage comparators are not energized and the ends of both relays will be in their "up" positions, and the valve in supply line 12c will be open, while the valves in supply line 12b and 12a will be closed. When $F_{To}$ is greater than $V_a$ but less than $V_b$ only voltage comparator 121 will be energized, and relay 123 will be in its "down" position and relay 124 will be in its "up" position and consequently only the valve in supply line 12b will be opened. When $F_{To}$ is greater than either $V_a$ or $V_b$, both voltage comparators will be energized and both relays will be in their "down" positions, and consequently the valve on supply line 12a will be opened. Similar tray selectors can be designed for any number of feed trays.

In another aspect of this invention, I propose to manipulate feed tray location and feed enthalpy in conjunction with the manipulation of reflux flow rate in the predictive manner disclosed in copending application Ser. No. 189,375 now U.S. Patent No. 3,296,097, filed Apr. 17, 1962, by D. E. Lupfer. In said copending application Ser. No. 189,375 now U.S. Patent No. 3,296,097, measurements are made of the flow rate of feedstock to the column and concentrations of components in said feedstock, signals are produced proportional to such measurements and combined with other signals proportional to constants in a statistically-derived equation to predict internal reflux flow rate of such a column, a signal is produced proportional thereto, and the external reflux flow rate is manipulated to maintain the predicted internal reflux flow rate value. Further, I also prefer to manipulate these variables in conjunction with the manipulation of bottom product flow rate in the manner disclosed in copending application Ser. No. 118,066, now U.S. Patent No. 3,224,947, filed June 19, 1961, by D. E. Lupfer. In said copending application Ser. No. 118,066, now U.S. Patent 3,224,947, measurements are made of the flow rate of the feed and components in the feed, signals are produced proportional thereto, and these signals are combined with another signal representing the rate at which the bottom product should be withdrawn from the column to make a preselected separation between components of the feed, and the flow rate of the bottom product controlled accordingly.

In FIGURE 1, I have generally designated as 112 an "operations computer," which is intended to include the reflux computer and bottom product flow computer means disclosed in said copending applications Ser. Nos. 189,375 now U.S. Patent Nos. 3,296,097, and 118,066, now U.S. Patent No. 3,224,947, respectively. In predicting the internal reflux according to said copending application Ser. No. 189,375, now U.S. Patent No. 3,296,097, it is necessary to employ values representative of average tray efficiency, E, feed tray location $F_T$, feed enthalpy $F_e$, specified liquid volume fraction $H_D$ of the heavy key in the distillate product, and specified liquid volume fraction $L_B$ of the light key in the bottom product, and I have illustrated in FIGURE 1 the introduction of input signals representing these values and the operations computer 112, with values for $F_T$ and $F_e$ being supplied by computers 66 and 67, respectively.

Operations computer 112 produces an output signal 113, proportional to the predicted internal reflux flow rate, and this value is used as a setpoint-adjusting signal for the flow controller 35 in the external reflux line 31, so as to maintain the predicted internal reflux. Operations computer 112 also produces an output signal 114 proportional to the predicted bottom product flow rate, and this signal is transmitted to a biasing relay 116 (e.g. a summing relay) which produces an output signal 115 that serves as a setpoint for flow controller 61 on bottom product line 36. Copending application Ser. No. 189,375 discloses that the manipulation of bottom product can be cascaded with suitable feedback control since the predictive control of internal reflux may often only be approximate and not exact, as is the case with many predictive controls. Thus, to achieve this feedback control, referring again to FIGURE 1, the overhead in line 24 is analyzed by means of analyzer 118 to determine the concentration of heavy key component, e.g., isopentane. Analyzer 118 can be a chromatographic, infrared, or ultraviolet analyzer, or the like, or a mass spectrometer, or any other suitable analyzer which will measure the concentration of the component and provide a signal representative thereof. Analyzer 118 produces an output signal corresponding to the concentration of the heavy key in overhead line 24 and it is transmitted to a controller 125, such as an analyzer recorder controller, where it is compared with a setpoint signal 120 proportional to $H_D$. Any difference in the actual or measured heavy key concentration in the overhead and $H_D$ is transmitted as a signal to bias relay 116. For example, if the key component in the bottom product is on specification, but the key component in the overhead is less than the specified concentration $H_D$, this means that the overhead (and consequently the distillate) has a purity greater than that necessary, i.e., that the column is being operated at operating costs greater than minimum. Accordingly, the analyzer controller 125 produces a signal 130 which can add to or subtract from the computed bottom flow signal 114. If computed bottom flow signal 114 is exactly that required to give the overhead product purity specified, signal 115 will equal signal 114. Due to errors in measurements and computing, signal 114 will be slightly altered by signal 130 to always produce the exact bottom flow setpoint 115 required.

Where the bottom product purity is of more importance than the distillate purity, analyzer means can analyze instead the bottom product to determine the concentration of the light key component therein, and the difference between this measurement and $L_B$ can be used to bias the computed bottom flow signal 114.

Various modifications and alterations of this invention will become apparent to those skilled in the art without departing from the scope and spirit of this invention, and it should be understood that this invention is not to be limited unduly to that set forth herein for illustrative purposes.

What is claimed is:

1. In a process wherein a multicomponent feed stream is heated in a preheater and the resulting heated feed stream is itnroduced into one of several trays in a fractional distillation column and separated therein into a vapor stream and a liquid product stream having a specified purity, said vapor stream is condensed, some of the condensed vapor stream is yielded as a distillate product stream having a specified purity, and heat is supplied to the reboiler of said column, a control method for supplying sufficient heat to said column to produce said products having specified purities while minimizing the cost of supplying heat to said preheater and reboiler, said method comprising the steps of measuring process variables indicative of the feed flow rate of said column; producing signals responsive to said measurements representative of the feed flow rate to said column; analyzing said feed stream to determine the concentration of components in said feed stream; producing signals representative of the concentration of at least one of said specified components; combining said signals in an operations computer based on the following expression:

$$X = f(F, F_c, E, F_T, F_e, H_D, L_B)$$

where:

$X$ = predicted value for one of column reflux flow rate and heat input rate
$F$ = flow rate of said feed stream
$F_c$ = generic symbol for the amounts of said feed components expressed as fractions of said feed stream
$E$ = tray efficiency of said column
$F_T$ = feed tray of said column, numbering trays from the top of said column
$F_e$ = enthalpy of said feed stream
$H_D$ = specified liquid fraction of heavy key component in said distillate product stream
$L_B$ = specified liquid fraction of light key component in said bottom product stream producing a signal representative of X; producing in a predictive feed enthalpy computer a signal representative of the optimum feed enthalpy based upon the following expressions:

$$C_{TS} = C_{PS} + C_{RS}$$

wherein $C_{TS}$ is the total cost of the heat supplied to the column by the reboiler represented by $C_{RS}$ and the feed preheater, represented by $C_{PS}$, and $$\frac{\partial C_{TS}}{\partial F_e} = 0$$

which is the partial derivative of $C_{TS} = C_{PS} + C_{RS}$ with respect to feed enthalpy, $F_e$, comparing in a predictive feed enthalpy controller the signal representative of the predicted optimum feed enthalpy with the signal representative of the actual feed enthalpy which is determined by an actual feed enthalpy computer; adjusting the flow rate of heat supplied to said feed preheater with the signal produced by said comparison of said actual feed enthalpy with said predicted optimum feed enthalpy thereby producing terminal product streams having specified purities at a minimum total cost of heat supplied to said column.

2. A process according to claim 1 which includes the steps of producing a signal in a predictive feed tray computer representative of the optimum feed tray location based on the expression:

$$C_{TS} = C_{PS} + C_{RS}$$

wherein $C_{TS}$, $C_{PS}$ and $C_{RS}$ are as defined above and $$\frac{\partial C_{TS}}{\partial F_T} = 0$$

which is the partial derivative of $C_{TS} = C_{PS} + C_{RS}$ with respect to feed tray wherein $F_T$ is as defined above; and transmitting said signal representative of the optimum feed tray location to a feed tray selector, said feed tray selector directing the flow of said feed to the optimum feed tray of said distillation column.

References Cited

UNITED STATES PATENTS

| | | | |
|---|---|---|---|
| 2,933,900 | 4/1960 | Hanthorn | 202—160 |
| 2,980,330 | 4/1961 | Ablow et al. | 235—150.1 |
| 3,048,331 | 8/1962 | Van Nice et al. | 235—150.1 |
| 3,079,079 | 2/1963 | Phister et al. | 235—150.1 |
| 3,143,643 | 8/1964 | Fluegel et al. | 235—150 |
| 3,150,064 | 9/1964 | Dobson | 202—160 |
| 3,151,237 | 9/1964 | Hrabak | 235—151.13 |

OTHER REFERENCES

Petroleum Refiner: J. F. Pink, March 1959, vol. 38, No. 3, pp. 215 to 220.

NORMAN YUDKOFF, *Primary Examiner.*

WILBUR L. BASCOMB, JR., *Examiner.*